United States Patent
Ikegaya et al.

(10) Patent No.: US 7,506,856 B2
(45) Date of Patent: Mar. 24, 2009

(54) SEAT SLIDE DEVICE

(75) Inventors: Isao Ikegaya, Shizuoka (JP); Takuji Soga, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 6 days.

(21) Appl. No.: 11/698,150

(22) Filed: Jan. 26, 2007

(65) Prior Publication Data

US 2007/0176072 A1 Aug. 2, 2007

(30) Foreign Application Priority Data

Jan. 27, 2006 (JP) .............................. 2006-018430

(51) Int. Cl.
*F16M 13/00* (2006.01)
(52) U.S. Cl. ....................... 248/430; 248/419; 248/424; 248/429; 296/65.13; 296/65.14; 296/65.15
(58) Field of Classification Search ................. 248/419, 248/424, 429, 430; 296/65.13, 65.14, 65.15
See application file for complete search history.

(56) References Cited

U.S. PATENT DOCUMENTS

| | | | | | |
|---|---|---|---|---|---|
| 4,238,099 | A | * | 12/1980 | Hunwicks | 248/430 |
| 4,742,983 | A | * | 5/1988 | Nihei | 248/429 |
| 4,781,354 | A | * | 11/1988 | Nihei et al. | 248/429 |
| 4,813,643 | A | * | 3/1989 | Nihei | 248/430 |
| 5,028,028 | A | * | 7/1991 | Yamada et al. | 248/430 |
| 5,167,393 | A | * | 12/1992 | Hayakawa et al. | 248/430 |
| 5,358,207 | A | * | 10/1994 | West | 248/430 |
| 5,918,846 | A | * | 7/1999 | Garrido | 248/429 |
| 5,971,342 | A | * | 10/1999 | Sakai et al. | 248/430 |
| 6,176,460 | B1 | * | 1/2001 | Kojima et al. | 248/429 |
| 6,354,553 | B1 | * | 3/2002 | Lagerweij et al. | 248/430 |
| 6,416,130 | B2 | * | 7/2002 | Yamada et al. | 297/344.11 |
| 6,435,465 | B1 | * | 8/2002 | Yamada et al. | 248/429 |
| 6,688,574 | B2 | * | 2/2004 | Okazaki et al. | 248/424 |
| 6,691,971 | B2 | | 2/2004 | Yamada et al. | |
| 6,869,057 | B2 | * | 3/2005 | Matsumoto et al. | 248/430 |
| 6,892,995 | B2 | * | 5/2005 | Tame et al. | 248/429 |

(Continued)

FOREIGN PATENT DOCUMENTS

CN 1513695 A 7/2004

(Continued)

*Primary Examiner*—J. Allen Shriver, II
*Assistant Examiner*—Michael McDuffie
(74) *Attorney, Agent, or Firm*—Foley & Lardner LLP (57) ABSTRACT

In a seat slide device applicable to an automotive vehicle, a lock mechanism includes: a lock arm disposed on an upper rail to be pivotable around a pivotal center axis; lock pawls formed on the lock arm along the elongate direction of the upper rail; lock holes formed on a lower rail and the upper rail, the lock pawls being inserted through the lock holes to lock the upper rail with respect to the lower rail; a pair of slits formed at predetermined front-and-rear positions of a side surface of the upper rail; and a bearing bracket, the bearing bracket and the lock arm being disposed within an enclosed space between the upper rail and the lower rail and including a pair of bearing portions and both ends of the lock arm and the pair of bearing portions being disposed within inner spaces defined by the pair of slits.

11 Claims, 5 Drawing Sheets

U.S. PATENT DOCUMENTS

| | | | |
|---|---|---|---|
| 6,902,235 B2 * | 6/2005 | Rohee et al. | 297/334 |
| 6,953,178 B2 * | 10/2005 | Yamada et al. | 248/429 |
| 6,981,681 B2 * | 1/2006 | Matsumoto | 248/424 |
| 2007/0090263 A1 * | 4/2007 | Yamada et al. | 248/429 |

FOREIGN PATENT DOCUMENTS

| | | |
|---|---|---|
| JP | 2003-146119 A | 5/2003 |
| JP | 2004-122825 A | 4/2004 |
| JP | 2004-210258 A | 7/2004 |
| JP | 2004-231106 A | 8/2004 |

* cited by examiner

SEAT SLIDE DEVICE

BACKGROUND OF THE INVENTION

1. Field of the Invention

The present invention relates generally to a seat slide device applicable to an automotive vehicle and, more particularly, relates to the seat slide device in which a lock mechanism which locks with a seat fixed onto the seat and slide device slid in a longitudinal direction of the vehicle is improved.

2. Description of the Related Art

Diversification of a seat layout is demanded in recent-year automotive vehicle seats. A seat slide device is installed not only on a front seat but also on a second seat or third seat of the vehicle. An installation of the seat slide device for the vehicle is as follows: an upper rail coupled to the seat is slidably assembled onto a lower rail fixed onto a floor of the vehicle and a lock mechanism is installed to modify and lock a slide position of the upper rail with respect to the lower rail.

The lock mechanism biases a lock arm pivotably attached onto the upper rail via a spring member and a lock pawl of the lock arm is fitted into each lock hole of the upper rail and the lower rail so that the upper rail is locked with respect to the lower rail.

Figure 6:
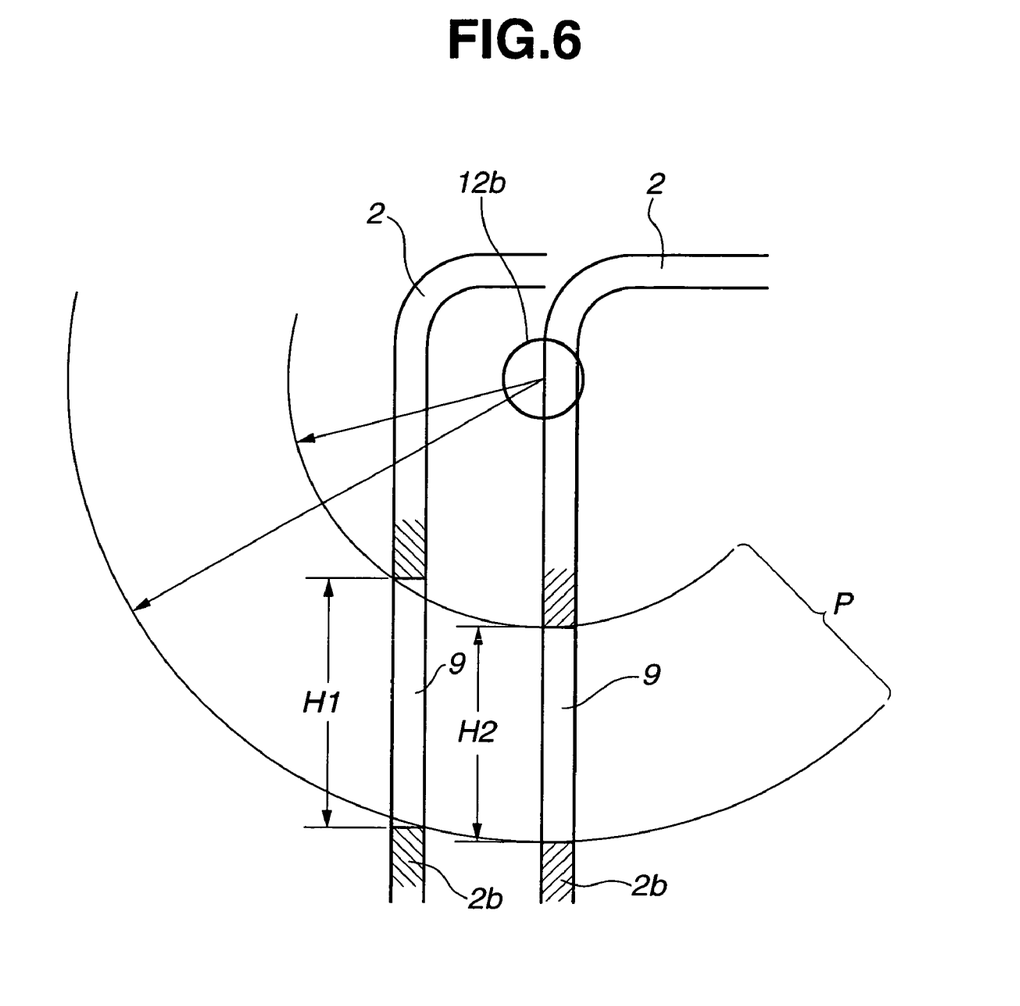
FIG. 6 is a comparative example of the seat slide device to the present invention representing a reference view of part of the seat slide device for explaining a height size of a lock hole formed on an upper rail.

An example comparative to the present invention will be described with reference to FIG. 6. As shown in FIG. 6, the lock arm is pivotably installed with a pivotal axle 12*b* as a center, pivotal axle 12*b* being along an elongate direction of upper rail 2. A height of lock hole 9 is needed to be larger than a vertical length of a portion overlapped between doughnut shaped orbits P indicating a pivotal orbit of the lock pawl to be fitted into a plurality of lock holes and a cross section of an upper wall portion 2*b* of upper rail 2. As shown in a left side of FIG. 6, in a case where pivotal axle 12*b* is disposed within an inside of upper wall portion 2*b*, upper wall portion 2*b* is separated in the leftward direction from a vertical plane passing pivotal axle 12*b*. Hence, the portion overlapped between doughnut shaped orbits P and the cross section of upper wall portion 2*b* becomes larger in the vertical direction so that the height of lock hole 9 is needed by H1. Whereas, as shown in the right side of FIG. 6, in a case where pivotal axle 12*b* is disposed approximately just above lock hole 9 so that upper wall portion 2*b* is approximately overlapped with pivotal axle 12*b*, the portion overlapped between doughnut shaped orbits P and the cross section of upper wall portion 2*b* becomes small in the vertical direction and the height of lock hole 9 is sufficiently needed only by H2. When a pivotal axle 12*b* is arranged at a position approximately just above lock hole 9, lock hole 9 formed on upper rail 2 can be reduced in the vertical direction. Since lock hole 9 is small, a strength of upper rail 2 against a bending becomes large. With these merits in mind, vehicular seat slide devices in each of which the pivotal axle of the lock arm is arranged approximately just above the lock hole have been proposed.

Various types of seat slide devices have been proposed as described above in each of which the pivotal axle of the lock arm is arranged just above the lock hole. Japanese Patent Application First Publication (tokkai) No. 2003-146119 published on May 21, 2003 (which corresponds to a U.S. Pat. No. 6,691,971), Japanese Patent Application First Publication No. 2004-122825 published on Apr. 22, 2004, and Japanese Patent Application First Publication (tokkai) No. 2004-231106 published on Aug. 19, 2004 exemplify previously proposed vehicular seat slide devices.

In a first one of the previously proposed vehicular seat slide devices disclosed in the Japanese Patent Application First Publication (tokkai) No. 2003-146119, a large window is formed on an upper wall portion of the upper rail and the whole lock arm is disposed at a position of the window. In a second one of the previously proposed vehicular seat slide device disclosed in the Japanese Patent Application First Publication No. 2004-122825, the large window is formed on an upper wall portion of the upper rail and the whole lock arm axially supported over the upper rail is inserted into the window. In a third one of the previously proposed vehicular seat slide devices disclosed in the Japanese Patent Application First Publication No. 2004-231106, a large opening is formed over a space between the upper wall portion of the upper rail to an upper side wall portion and the whole lock arm is arranged on the opening portion.

SUMMARY OF THE INVENTION

However, since, in each of the lock mechanisms disclosed in the above-described three Japanese Patent Application First Publications, the large opening through which the whole lock arm is accommodated is formed on the upper rail, the strength (rigidity) of the upper rail against the bending of the upper rail is accordingly reduced.

It is, hence, an object of the present invention to provide a seat slide device in which pivotal axles of the lock arm are arranged at positions overlapped with the upper side wall portion of the upper rail without a formation of a large opening on the upper rail.

According to one aspect of the present invention, there is provided with a seat slide device comprising: a lower rail having a channel structure; an upper rail having a channel structure, the upper rail being slidably engaged with the lower rail in a manner to define an elongate enclosed space therebetween; and a lock mechanism including a lock arm disposed on the upper rail to be pivotable around a pivotal center axis which is approximately in parallel to an elongate direction of the upper rail, at least two lock pawls formed on the lock arm along the elongate direction of the upper rail, a plurality of lock holes formed on the lower rail and the upper rail, the lock pawls being inserted through the lock holes to lock the upper rail with respect to the lower rail, a pair of slits formed at predetermined front-and-rear positions of a side surface of the upper rail, and a bearing bracket configured to pivotably support the lock arm, the bearing bracket and the lock arm being disposed within the enclosed space between the upper rail and the lower rail and including a pair of bearing portions configured to pivotably support both ends of the lock arm via a pair of pivotal axles of the pair of bearing portions, both ends of the lock arm and the pair of bearing portions being disposed within inner spaces defined by the pair of slits.

According to another aspect of the present invention, there is provided with an assembling method of a seat slide device, comprising: providing a lower rail having a channel structure; providing an upper rail having a channel structure, the upper rail being slidably engaged with the lower rail in a manner to define an elongate enclosed space therebetween; and providing a lock mechanism including a lock arm disposed on the upper rail to be pivotable around a pivotal center axis which is approximately in parallel to an elongate direction of the upper rail, at least two lock pawls formed on the lock arm along the elongate direction of the upper rail, a plurality of lock holes formed on the lower rail and the upper rail, the lock pawls being inserted through the lock holes to lock the upper rail with respect to the lower rail, a pair of slits formed at predetermined front-and-rear positions of a side surface of the upper rail, and a bearing bracket configured to pivotably support the lock arm, the bearing bracket and the lock arm being disposed within the enclosed space between the upper rail and the lower rail and including a pair of bearing portions configured to pivotably support both ends of the lock arm via a pair of pivotal axles of the pair of bearing portions, both ends of the lock arm and the pair of bearing portions being disposed within inner spaces defined by the pair of slits.

According to the present invention, in the seat slide device, pivotal axles of the lock arm are disposed at positions overlapped with a side surface of the upper rail. Hence, a height size of a lock hole formed on the upper rail can be reduced and a space to house a spring used to bias the lock arm in a lock state can widely be secured in an inner space of the upper rail. In addition, the pair of slits formed on the upper rail to dispose the pivotal axles can provide a small opening area having a minimum size only for disposing ends of the lock arm and bearing portions of a bearing bracket for the pivotal axles therein. Thus, a reduction of the rigidity (strength) of the upper rail against the bending can be minimized. The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
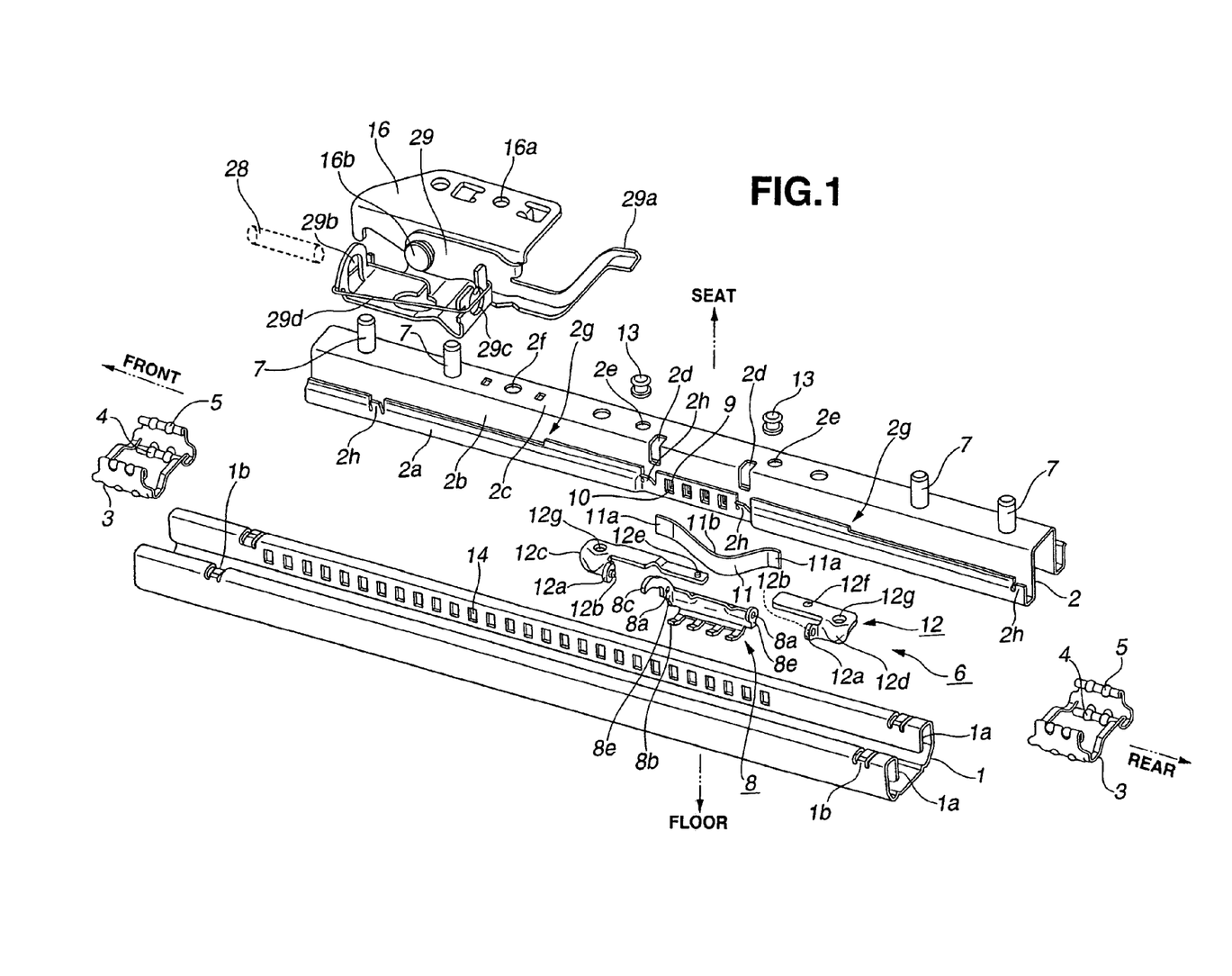
FIG. 1 is an exploded perspective view of a seat slide device applicable to an automotive vehicle in a preferred embodiment according to the present invention.
Figure 2:
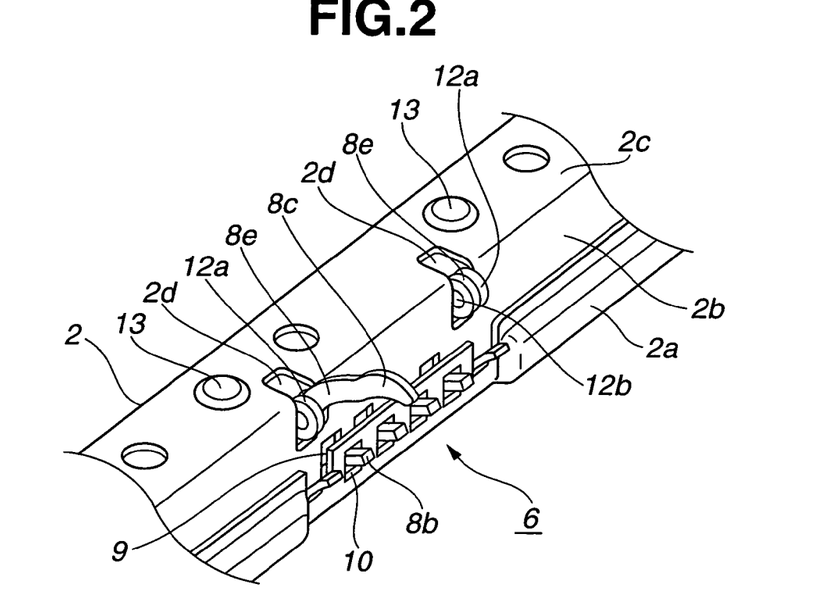
FIG. 2 is a perspective view of an upper rail in the proximity of a lock arm shown in FIG. 1.
Figure 3:
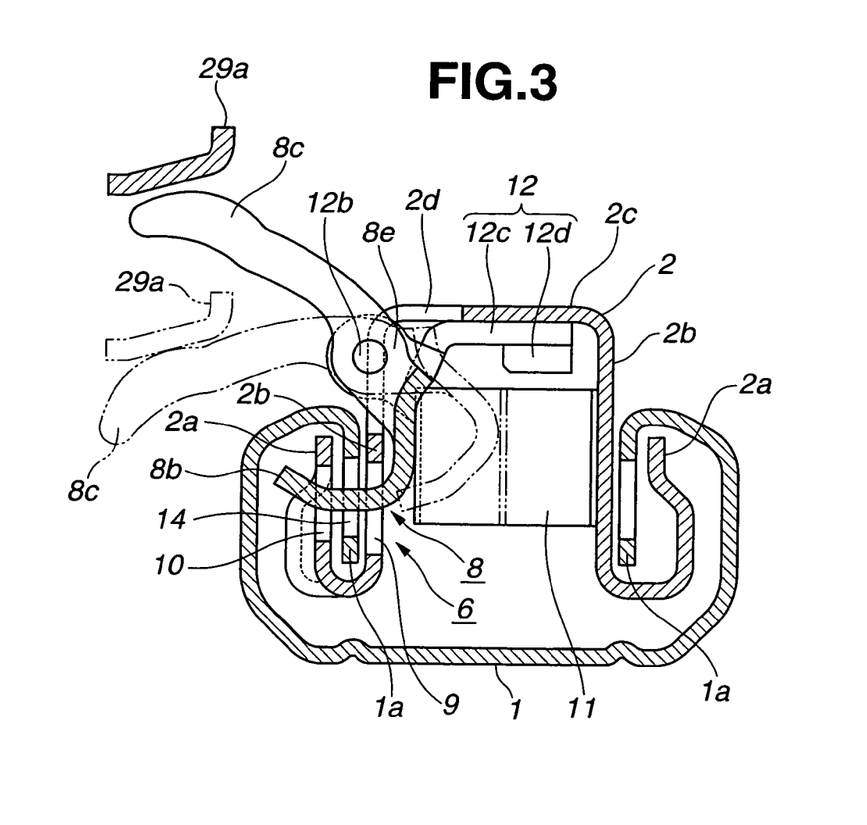
FIG. 3 is a cross sectional view of the seat slide device representing an essential part of the seat slide device in the embodiment according to the present invention.
Figure 4A:
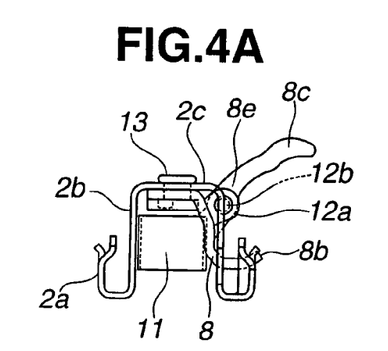
FIGS. 4A, 4B, 4C, and 4D are a left side view, a plan view, a front view, and a bottom view of the proximity of the lock arm of the seat slide device in the preferred embodiment according to the present invention.
Figure 4B:
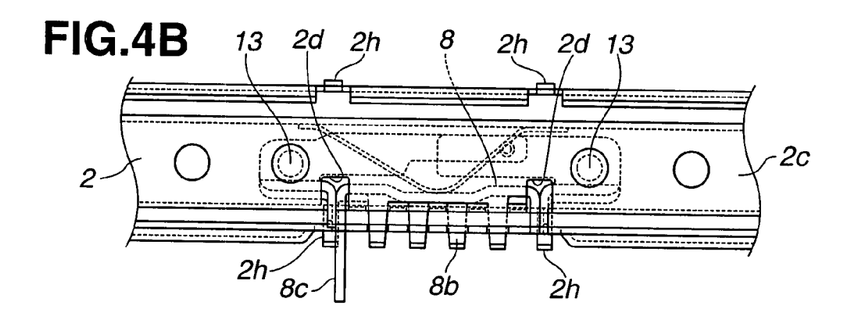
Figure 4C:
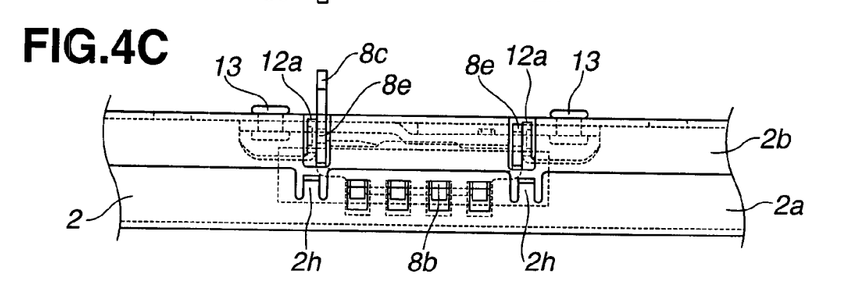
Figure 4D:
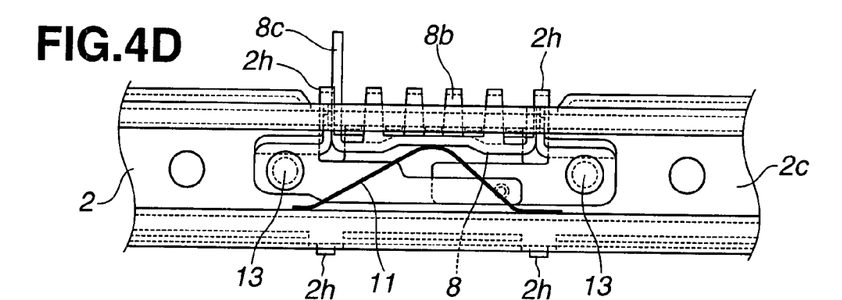

FIG. 1 shows an exploded perspective view of a seat slide device according to the present invention. FIG. 2 shows a perspective view of the proximity of a lock arm. FIG. 3 shows a cross sectional view of the seat slide device according to the present invention.

As shown in FIG. 1, the seat slide device includes: a lower rail 1 having a channel structure and to be fixed onto a floor of the vehicle; and an upper rail 2 having a channel structure and to be attached at left and right positions of a lower part of a seat of an automotive vehicle. Upper rail 2 is slidably moved in an elongate direction via guide balls 4, 5 held on a pair of retainers 3. Bolts (not shown) are inserted through attaching holes (not shown) located at both ends of lower rail 1 and lower rail 1 is to be fixed onto the floor of the vehicle via the bolts.

As shown in FIG. 3, a cross sectional shape of lower rail 1 is formed by extending downward oriented bending portions 1a bent at an inner side of the bending portions respectively on an upper end of a basic cross sectional portion in an approximately Japanese letter of ⊐shape whose upper portion is opened. The cross sectional shape of upper rail 2 is formed by respectively extending upper bending portions 2a on a lower end of the basic cross sectional portion in the approximately Japanese letter of ⊐shape whose lower portion is opened. As shown in FIG. 1, upper rail 2 is attached at left and right positions of the lower end of the seat via bolts 7.

Figures 5A, 5B, 5C:
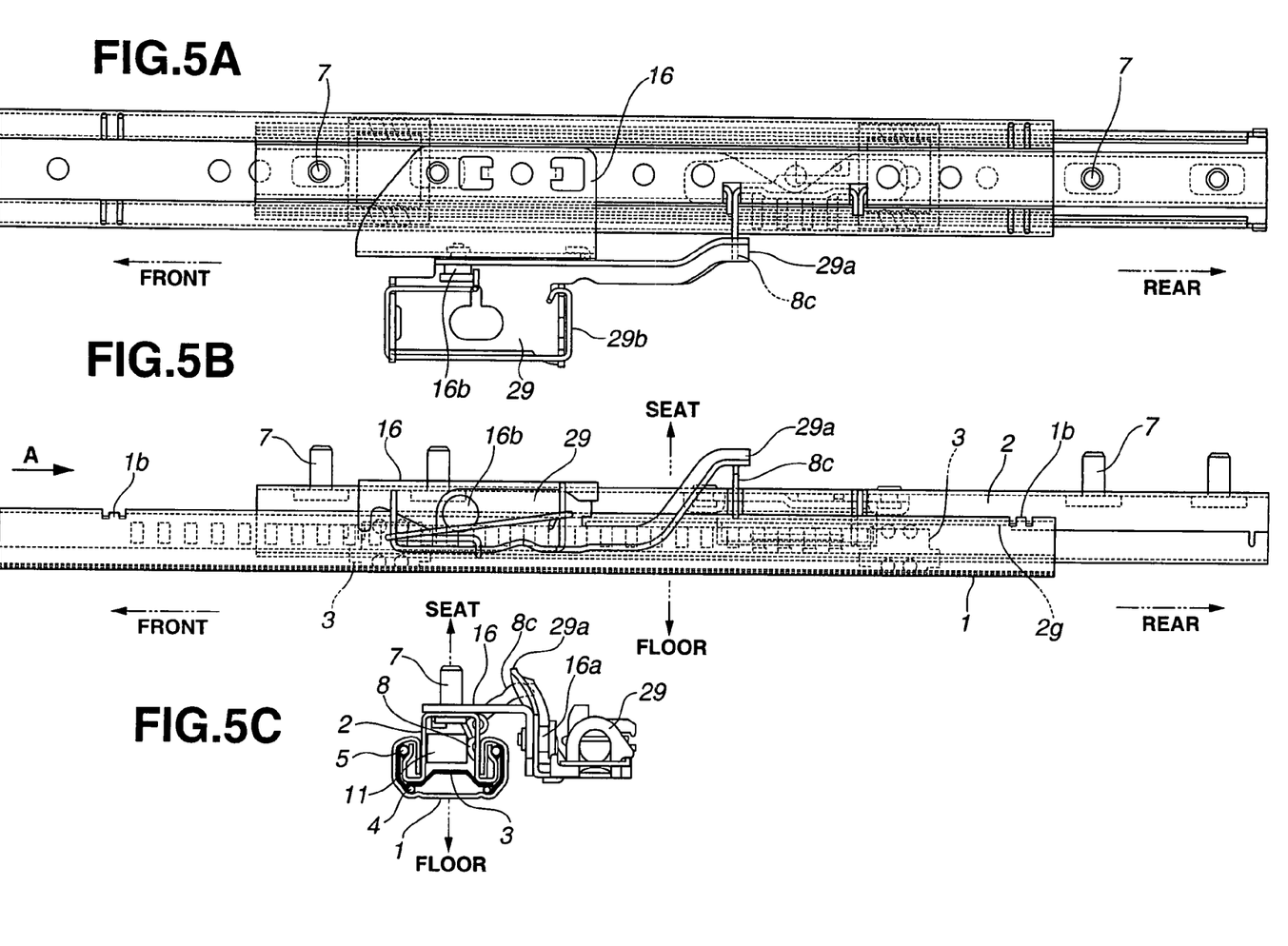
FIGS. 5A, 5B, and 5C are plan view of the seat slide device in the preferred embodiment according to the present invention, a top view thereof, and a side view thereof viewed from an arrow marked direction of A shown in FIG. 5B, respectively.

Then, upper rail 2 is assembled for downward oriented bending portion 1a of lower rail 1 to be inserted between an upward oriented bending portion 2a and upper side wall 2b opposing upward oriented bending portion 2a. As shown in FIG. 5C, each retainer 3 is incorporated between lower rail 1 and upper rail 2 in a freedom state. Each guide ball 4 held by corresponding one of retainers 3 supports a lower surface of upward oriented bending portion 2a of upper rail 2 and each guide ball 5 guides a side surface of upward oriented bending portion 2a of upper rail 2. Stopper portions 1b provided on both sides of an upper surface of lower rail 1 and located at longitudinal (front and rear) ends of lower rail 1 to set a movement range of upper rail 2 are formed by cutting parts of lower rail 1 in the downward direction. Two stepped portions 2g contacted with stopper portions 1b are formed on upper rail 2 by making parts of upward oriented bending portions 2a higher than other parts. In addition, stoppers (or latches) 2h to prevent retainers 3 from coming out from upper rail 2 are formed at four locations in the lengthwise (elongate) direction of upward oriented bending portion 2a of upper rail 2. The movement of each retainer 3 is limited with the corresponding one of retainers 3 contacted on an end surface of each of stoppers (latches) 2h.

A lock mechanism 6 is provided to slide upper rail 2 along lower rail 1 and movably fix upper rail 2 to lower rail 1 at an enclosed space defined by lower rail 1 and upper rail 2 described above. Lock mechanism 6 includes a bearing bracket 12, a lock arm 8 pivotably supported on bearing bracket 12, lock holes (second and third lock holes) 9, 10 of upper rail 2, and lock holes (first lock holes) 14 of lower rail 1. Upper rail 2 is locked with respect to lower rail 1 by inserting lock pawls 8b through lock holes 9, 14, and 10 simultaneously.

Next, a relationship between lock arm 8 and bearing bracket 12 will be described below. A pair of slits 2d are formed at the longitudinal positions of a side surface of upper rail 2. On the other hand, lock arm 8 and bearing bracket 12 to pivotally support lock arm 8 are formed within the inner space of upper rail 2. Lock arm 8 is formed in an approximately Japanese letter of ⊐shape in cross section by forming a pair of arm portions 8e mutually opposed in parallel to each other. Lock arm 8 is pivotally supported on bearing bracket 12 with the ends of the pair of arm portions 8e as a center. That is to say, a pair of axial holes 8a are formed through portions of respective arm portions 8e located in the same straight lines. On the other hand, a pair of bearing portions 12a are formed on bracket pieces 12 in the approximately Japanese letter of ⊐shape. A pair of pivotal axles 12b are integrally projected at positions mutually opposing respective bearing portions 12a. Then, the pair of pivotal axles 12b are fitted into corresponding axial holes 8a. These pivotal axles 12b are formed by an embossing. As shown in FIG. 2, with pivotal axles 12b fitted into respective axial holes 8a, the ends of arm portions 8e of lock arm 8 and bearing portions 12a of bearing bracket 12 are inserted into slits 2d in a direction from the inside portions of upper rail 2 toward an external side and arranged respectively in the inner sides of pair of slits 2d.

As shown in FIG. 1, four lock pawls 8b are formed along the lengthwise (elongate) direction of upper rail 2 on a circumference of a circle separated from axial hole 8a by a predetermined radius. Then, input arm portion 8c is integrally formed on one of the pair of arms 8e to release the lock with lock arm 8 (in a lock release state) operated from an external of upper rail 2. Hence, one of the pair of arms 8e is integrally formed with an input arm portion 8c.

Lock arm 8 and bearing bracket 12 are attached into an inside of upper rail as will be described below. Bearing bracket 12 is constituted by a combination of a pair of bearing bracket pieces 12c, 12d in approximately letter L shape. In pair of bearing bracket pieces 12c, 12d, a convex portion 12e is formed on a junction portion which is offset by a board thickness in a thickness direction of one of the pair of bearing bracket pieces 12c. Convex portion 12e is fitted into recess portion 12f formed on the other bearing bracket piece 12d and integrated by joining convex portion 12e to recess portion 12f through a spot welding to form bearing bracket 12. Bearing bracket 12 is coupled on the lower surface of an upper wall portion 2c of upper rail 2 via two rivets 13 inserted into a pair of first attaching holes 12g formed on a plane portion of bearing bracket 12 and second attaching holes 2e formed by penetrating into an inner part of upper wall portions 2c of upper rail 2.

In order to bias lock arm 8 attached pivotably into an inside of upper rail in a lock direction, a plate spring 11 in an approximately Japanese letter of < shape is provided. Plate spring 11 has its contact portions 11a at both ends thereof contacted on upper side wall portion 2b of upper rail 2 and has its bending portion 11b contacted on a rear surface of lock arm 8. As shown in FIG. 3, a stopper portion (not shown) penetrating upper rail 2 so as to prevent plate spring 11 from coming out of upper rail 2 is installed. One of contact portions 11a engageably retained at upper wall portion 2c and the other contact portion 11a is movably engaged with the lengthwise (elongate) direction of upper side wall portion 2b.

As shown in FIG. 1, four lock holes 9, 10 are respectively formed so as to correspond to the number of lock pawls 8b at a position corresponding to the elongate direction of downward oriented bending portions 2a and upper side wall portions 2b of upper rail 2. In addition, a multiple number of first lock holes 14 are formed along the lengthwise direction at downward oriented bending portion 1a of lower rail 1. Since these second lock holes 9, first lock holes 14, and third lock holes 10 are parts for lock pawls 8b to be inserted and engaged, the positions of heights of these lock holes are approximately the same. In addition, these lock holes are parts of lock pawls 8b of lock arm 8 to be inserted and to be fitted. Hence, pitches of these lock holes 9, 14, and 10 are the same as those of mutual lock pawls 8b.

As shown in FIG. 2, pair of slits 2d are formed to bridge from upper wall portion 2c of upper rail 2 to upper side wall portion 2b thereof. Input arm portion 8c integrally formed at one of pair of arm portions 8e is projected from one of slits 2d. On the other hand, as shown in FIGS. 1 and FIGS. 5A, 5B, and 5C, a bracket 16 is attached onto the upper surface of upper wall portions 2c via rivets inserted into second attaching holes 2f and another attaching holes 16a. In addition, left and right handle holders 29 are axially and swingably in a vertical direction (of the vehicle) supported on bracket 16 via a horizontal axle 16b extended along the longitudinal direction of the vehicle. Each handle holder 29 is axially supported on the upper part of upper rail 2 of a pair of seat slide devices arranged at left and right positions of the seat to be enabled to swing, respectively, and includes a center of an operational lever (not shown) in a approximately letter U shape and both left and right ends of a rearward portion of the vehicle is attached onto left and right handle holders 29.

That is to say, both left and right ends of the vehicular rearward portion of operational lever 28 are inserted into hole 29b and cut-out portion 29c of one of handle holders 29 shown in FIG. 1. A spring 29d causes operational lever to serve as a coming out stopper against handle holders 29 and to be prevented from jolting (or shaking). Hence, by pulling out the front portion of operational lever, a pressing portion 29a located at each of rear end portions of left and right handle holders 29 is simultaneously pressed toward the downward direction with respect to upper rail 2. Hence, lock arm 8 against a biasing force of plate spring 11 is pivoted in the downward direction. Hence, lock pawl 8b simultaneously comes out of lock holes 9, 14, and 10 in a lock release state.

Next, an action of the seat slide device described above will be described below. When the seat is locked at an arbitrary position, a state in which lock arm 8 is pivoted and displaced toward a clockwise direction upon receipt of a biasing force of plate spring 11 occurs. At this time, lock pawls 8b are inserted into three of third lock holes 9 of upper rail 2, first lock holes 14 of lower rail, and third lock holes 10 of upper rail 2 for the seat to be in a lock state.

In a case where the seat is modified at a position different in the longitudinal direction of the vehicle from the above-described lock state, the front portion of operational lever (not shown) is pulled up in the upward direction and is pivoted. At this time, when pressed portion 29a located at the rear end portion of each handle holder 29 presses input arm portion 8c in the downward direction and lock arm 8 is pivoted in a counterclockwise direction against the biasing force of plate spring 11, thus lock pawls 8b of lock arm 8 are pulled from three of third, first, and second lock holes 10, 14, and 9 so that the seat slide device is in a lock release state as denoted in a phantom line in FIG. 3. Thus, upper rail 2 and the seat can freely be slid.

In the above-described lock release state, the slide position of the seat is modified at an arbitrary position and, thereafter, operational lever 28 is opened. Then, lock arm 8 is recovered in its original state by means of the biasing force of plate spring 11. As shown by a solid line in FIG. 3, lock pawls 8b are again inserted into three of lock holes 10, 14, and 9 to be in the lock state so that the seat is fixed via upper rail 2 and lower rail 1. FIGS. 5A, 5B, and 5C integrally show a state in which upper rail 2 is slid at a most rearward position. Stepped portions 2g of upper rail 2 are contacted on corresponding stopper portions 1b of lower rail 1.

According to the present invention, pivotal axles 12b, 12b of lock arm 8 are arranged at positions overlapped with a side surface of upper rail 2. Hence, a height size of second lock holes 9 formed on upper rail 2 can be reduced and a space to house plate spring 11 to bias lock arm 8 can widely be secured in the inside of upper rail 2. In addition, an opening area of slit 2d formed on upper rail 2 to arrange pivotal axle 12b can be set to a minimum size only by arranging the end portion of arm 8e of lock arm 8 and bearing portions 12a of bearing bracket 12. A reduction of the rigidity of upper rail 2 with respect to the bending can be suppressed to be small.

According to the present invention, pivotal axle 12b projected on bearing portion 12a of bearing bracket 12 is fitted into axial hole 8a of arm 8e of lock arm 8. Thus, the formation of pivotal axle 12b can easily be carried out through the embossing. Furthermore, a length of added parts of the end portion of lock arm and the bearing bracket becomes reduced and a width size of the slits to arrange these parts can be reduced.

Furthermore, according to the present invention, as shown in FIG. 2, in a state in which pivotal axle 13b of bearing portion 12a of bearing bracket 12 is inserted into axial hole 8a of arm 8e of lock arm 8, end portions of arms 8e and bearing portions 12a of bearing bracket 12 are arranged within the inner spaces of the pair of pair of slits 2d. Hence, even if lock pawls 8b are tried to be deformed upon the receipt of a compression weight due to an input of collision of the vehicle, bearing portions 12a and arms 8e are caught between the side walls of pair of slits 2d. Hence, the deformation becomes reduced so that pivotal axles 12b fitted into axial holes 8a can be prevented from coming out of axial holes 8a.

It is noted that, in the preferred embodiment, each pivotal axle is projected on the bearing portion of the bearing bracket and each axial hole is formed on the arm portion of the lock arm. However, the present invention is not limited to this. The pivotal axles may be projected on the arm portions of the lock arm and the axial holes of the bearing portions of the axial bracket may be formed. In addition, in the preferred embodiment, as the bearing bracket, both of two bearing bracket pieces are coupled and attached onto upper rail 2. However, two bearing bracket pieces may individually and separately be attached onto upper rail 2 directly or via other parts. Or alternatively, an integral bearing bracket in the approximately Japanese letter of コ shape may be adopted without a division. At this time, in a state in which the bearing portions are opened, the pivotal axle may be fitted into the axial hole of the upper rail. Furthermore, the lock arm may pivotably be supported on the bearing bracket via caulked pin or so on separately without an integral formation of the lock arm with the bearing bracket. However, in this case, it is necessary to enlarge the width of each of the slits by a length of the caulked pin. It is noted that, in FIGS. 1, 5A, 5b, and 5C, front corresponds to a front direction of the vehicle, rear corresponds to a rear direction of the vehicle, floor corresponds to the floor of the vehicle, seat corresponds to one of the front seat of the vehicle, the second seat thereof, or the third seat thereof.

This application is based on a prior Japanese Patent Application No. 2006-018430. The entire contents of the Japanese Patent Application No. 2006-018430 with a filing date of Jan. 27, 2006 are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat slide device comprising:
  a lower rail having a channel structure;
  an upper rail having a channel structure, the upper rail being slidably engaged with the lower rail in a manner to define an elongate enclosed space therebetween; and
  a lock mechanism including:
    a lock arm disposed on the upper rail to be pivotable around a pivotal center axis which is approximately in parallel to an elongate direction of the upper rail, wherein the lock arm has a pair of arm portions,
    at least two lock pawls formed on the lock arm along the elongate direction of the upper rail,
    a plurality of lock holes formed on the lower rail and the upper rail, the lock pawls being insertable through the lock holes to lock the upper rail with respect to the lower rail,
    a pair of slits formed at predetermined front-and-rear positions of a side surface of the upper rail and formed to bridge from a top wall portion of the upper rail to an upper side wall portion of the upper rail, and
    a bearing bracket configured to pivotably support the lock arm,
  wherein the bearing bracket and the lock arm are disposed within the enclosed space between the upper rail and the lower rail,
  wherein the bearing bracket includes a pair of bearing portions configured to pivotably support both ends of the pair of arm portions of the lock arm via a pair of pivotal axles on the pair of bearing portions,
  wherein the pair of bearing portions and both ends of the pair of arm portions of the lock arm are insertable into the pair of slits in a direction from an inner side of the upper rail to an external side of the upper rail with both ends of the pair of arm portions of the lock arm pivotally supported on the pair of bearing portions of the bearing bracket, and
  wherein both ends of the pair of arm portions of the lock arm and the pair of bearing portions are disposed within inner spaces defined by the pair of slits.

2. The seat slide device as claimed in claim 1, wherein the pair of pivotal axles are integrally formed with the pair of bearing portions along the pivotal center axis and projected from the pair of bearing portions and a pair of axial holes are formed on both ends of the lock arm, the pair of pivotal axles being fitted into the pair of axial holes, respectively.

3. The seat slide device as claimed in claim 1, wherein the lock arm is formed of an approximately C-shape in cross section.

4. The seat slide device as claimed in claim 2, wherein an input arm portion is integrally projected from one of both ends of the lock arm.

5. The seat slide device as claimed in claim 4, wherein the lock mechanism further includes a plate spring shaped to bias the lock arm to be pivoted in a lock direction, the plate spring having a bending portion at a center thereof for contacting a surface of the lock arm and contact portions at both ends thereof for contacting the upper side wall portion of the upper rail, the plate spring always biasing tips of the lock pawls toward the upper side wall portion of the upper rail.

6. The seat slide device as claimed in claim 5, wherein the plurality of lock holes formed on the lower rail and the upper rail comprises a plurality of first lock holes formed along a downward oriented bending portion of the lower rail consecutively between stopper portions formed at front-and-rear ends of the lower rail, at least two second lock holes formed on the upper side wall portion of the upper rail between the pair of slits, and at least two third lock holes formed on an upward oriented bending portion of the upper rail between two latches formed at the same positions on the upper rail as the pair of slits.

7. The seat slide device as claimed in claim 6, wherein the lock pawls of the lock arm are penetrated through the first, second, and third lock holes simultaneously by a biasing force of the plate spring.

8. The seat slide device as claimed in claim 7, wherein the slide device further comprises a pressing portion of a handle holder for pressing the input arm portion of the lock arm toward a downward direction with respect to the upper rail to cause the lock pawls to be pivoted with the pair of pivotal axles as a center against the biasing force of the plate spring such that the lock pawls are pulled from the first, second, and third lock holes so as to be in a lock release state.

9. The seat slide device as claimed in claim 2, wherein the bearing bracket comprises a pair of bearing bracket pieces, each being in an approximately letter L shape, one of the pair of bearing bracket pieces having a junction portion formed by an offset of the one of the pair of bearing bracket pieces in a thickness direction thereof by a board thickness, the junction portion having a convex portion which is fitted into a recess portion formed on the other of the pair of bearing bracket pieces to integrally form the bearing bracket.

10. The seat slide device as claimed in claim 9, wherein a pair of first attaching holes are formed on plane portions of the pair of bearing bracket pieces and a pair of second attaching holes are penetrated through the top wall portion of the upper rail approximately adjacent to a corresponding one of the pair of the slits to couple the pair of bearing bracket pieces to a lower surface of the top wall portion of the upper rail via the pair of first attaching holes and two rivets.

11. A seat slide device comprising:
a lower rail having a channel structure;
an upper rail having a channel structure, the upper rail being slidably engaged with the lower rail in a manner to define an elongate enclosed space therebetween; and
a lock mechanism including:
a lock arm disposed on the upper rail to be pivotable around a pivotal center axis which is approximately in parallel to an elongate direction of the upper rail,
at least two lock pawls formed on the lock arm along the elongate direction of the upper rail,
a plurality of lock holes formed on the lower rail and the upper rail, the lock pawls being insertable through the lock holes to lock the upper rail with respect to the lower rail,
a pair of slits formed at predetermined fi-ont-and-rear positions of a side surface of the upper rail, and
a bearing bracket configured to pivotably support the lock arm,
wherein the bearing bracket and the lock arm are disposed within the enclosed space between the upper rail and the lower rail,
wherein the bearing bracket includes a pair of bearing portions configured to pivotably support both ends of the lock arm via a pair of pivotal axles on the pair of bearing portions,
wherein both ends of the lock arm and the pair of bearing portions are disposed within inner spaces defined by the pair of slits,
wherein the pair of pivotal axles are integrally formed with the pair of bearing portions along the pivotal center axis and projected from the pair of bearing portions and a pair of axial holes are formed on both ends of the lock arm, the pair of pivotal axles being fitted into the pair of axial holes, respectively,
wherein the lock arm is formed of an approximately C-shape in cross section,
wherein the lock mechanism further includes a plate spring shaped to bias the lock arm to be pivoted in a lock direction, the plate spring having a bending portion at a center thereof for contacting a surface of the lock arm and contact portions at both ends thereof for contacting an upper side wall portion of the upper rail, the plate spring always biasing tips of the lock pawls toward the upper side wall portion of the upper rail, and
wherein the plurality of lock holes formed on the lower rail and the upper rail comprises a plurality of first lock holes formed along a downward oriented bending portion of the lower rail consecutively between stopper portions formed at front-and-rear ends of the lower rail, at least two second lock holes formed on the upper side wall portion of the upper rail between the pair of slits, and at least two third lock holes formed on an upward oriented bending portion of the upper rail between two latches formed at the same positions on the upper rail as the pair of slits.

\* \* \* \* \*